US010489465B2

(12) United States Patent
Mawanda

(10) Patent No.: US 10,489,465 B2
(45) Date of Patent: Nov. 26, 2019

(54) DIGITAL SCRAPBOOKING

(71) Applicant: Musa Kajoba Mawanda, Hayward, CA (US)

(72) Inventor: Musa Kajoba Mawanda, Hayward, CA (US)

(*) Notice: Subject to any disclaimer, the term of this patent is extended or adjusted under 35 U.S.C. 154(b) by 238 days.

(21) Appl. No.: 15/179,944

(22) Filed: Jun. 10, 2016

(65) Prior Publication Data
US 2016/0364105 A1 Dec. 15, 2016

Related U.S. Application Data

(60) Provisional application No. 62/175,219, filed on Jun. 13, 2015.

(51) Int. Cl.
| | | |
|---|---|---|
| *G06F 16/93* | (2019.01) |
| *G06F 16/20* | (2019.01) |
| *G06Q 50/00* | (2012.01) |
| *G06F 16/9537* | (2019.01) |
| *G06F 3/0481* | (2013.01) |
| *H04L 29/08* | (2006.01) |
| *G06F 17/27* | (2006.01) |
| *H04L 29/06* | (2006.01) |

(52) U.S. Cl.
CPC ......... *G06F 16/93* (2019.01); *G06F 3/0481* (2013.01); *G06F 16/20* (2019.01); *G06F 16/9537* (2019.01); *G06Q 50/01* (2013.01); *H04L 67/02* (2013.01); *G06F 17/272* (2013.01); *H04L 67/10* (2013.01); *H04L 67/2833* (2013.01); *H04L 67/42* (2013.01)

(58) Field of Classification Search
CPC .. G06F 17/272; G06F 3/0481; G06F 16/9537; G06F 16/20; G06F 16/93; H04L 67/02; H04L 67/10; H04L 67/2833; H04L 67/42; H04L 67/22; G06Q 50/01
See application file for complete search history.

(56) References Cited

U.S. PATENT DOCUMENTS

| | | | | |
|---|---|---|---|---|
| 2007/0250479 A1* | 10/2007 | Lunt | ...................... | G06Q 10/10 |
| 2011/0138306 A1* | 6/2011 | Soohoo | ................... | G06Q 30/00 715/760 |
| 2011/0179049 A1* | 7/2011 | Caldwell | ................ | G06Q 10/00 707/755 |
| 2013/0036171 A1* | 2/2013 | Gilbert | .................... | G06Q 50/01 709/204 |
| 2013/0080897 A1* | 3/2013 | Han | ...................... | G11B 27/034 715/723 |
| 2014/0250185 A1* | 9/2014 | Carmichael | ............ | G06Q 50/01 709/204 |
| 2015/0134371 A1* | 5/2015 | Shivakumar | ........... | G06Q 10/02 705/5 |
| 2015/0212984 A1* | 7/2015 | Bowden | ............ | G06F 17/30867 715/234 |

* cited by examiner

*Primary Examiner* — Nicholas Ulrich
(74) *Attorney, Agent, or Firm* — Nwamu, P.C.

(57) ABSTRACT

A data aggregation system and method. A plurality of data source options is retrieved and displayed to a user. The user can select data from a data source, and the data aggregation system suggests additional data. The additional data is retrieved and compiled into a timeline with the data based on date information. A smart storybook engine prompts the user for additional contextual information and incorporates the contextual information into the timeline. The timeline can be output as a storybook or biography.

15 Claims, 11 Drawing Sheets

DIGITAL SCRAPBOOKING

The present application claims the benefit of priority to U.S. Provisional Application Ser. No. 62/175,219, titled "MULTISOURCE DATA AGGREGATION," filed on Jun. 13, 2015, the entirety of which is incorporated by reference herein.

BACKGROUND

The present invention relates generally to computer communication systems and methods and more specifically to computer communication systems and methods for multisource data aggregation.

Information about a person is everywhere. Social media participants have personal and other information on social media sites such as Facebook, for example. A user might have pictures of a recent reunion of friends on Facebook. Users have stories on their walls about other events and connections to other friends.

Users might also have offline information, residing for example on CDs, including photos of loved ones, birthday parties, and other memorable events. Users may also have music from a lifetime of collections. These are but examples of information about users that exist.

It is within the aforementioned context that a need for the present disclosure has arisen. Thus, there is a need to address one or more disadvantages of conventional systems and methods, and the present disclosure meets this need.

BRIEF SUMMARY

Various aspects of multisource data aggregation systems and methods can be found in exemplary embodiments of the present disclosure.

In one implementation, the multisource data aggregation system is a platform for creating and sharing comprehensive journals, scrapbooks, biographies and the like. Several data source options for the comprehensive journals are first retrieved and displayed to a user. The data source options may include data sources with data about the user. The user can select data from any one or more of the data sources for aggregation.

Here, data sources might include, without limitation, email systems, calendar and calendar events, news events, social media systems, online and offline storage systems, backup systems, stored video and audio files, and photos, for example. Other sources may include locally stored files, cloud-based content, photos, comments on photos from social networking sites, ancestry information, DNA information, historic events, and news articles, for example.

In turn, the data aggregation system may suggest additional data based on the selected data and/or data sources. The additional data is retrieved and compiled into a timeline with the data based on date information. A smart storybook engine prompts the user for additional contextual information and incorporates the contextual information into the timeline. The timeline can be output as a storybook or biography, for example.

In this manner, even where information about a person is everywhere, users have access via a single interface and can collate and employ such disparate data sources to tell a consistent story. Social media participants with personal and other information on social media sites such as Facebook, for example, can combine online and offline information residing for example on CDs and online storage platforms to generate a coherent story using such data sources.

A further understanding of the nature and advantages of the present disclosure herein may be realized by reference to the remaining portions of the specification and the attached drawings. Further features and advantages of the present disclosure, as well as the structure and operation of various embodiments of the present disclosure, are described in detail below with respect to the accompanying drawings. In the drawings, the same reference numbers indicate identical or functionally similar elements.

DETAILED DESCRIPTION

Reference will now be made in detail to the embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

Figure 1:
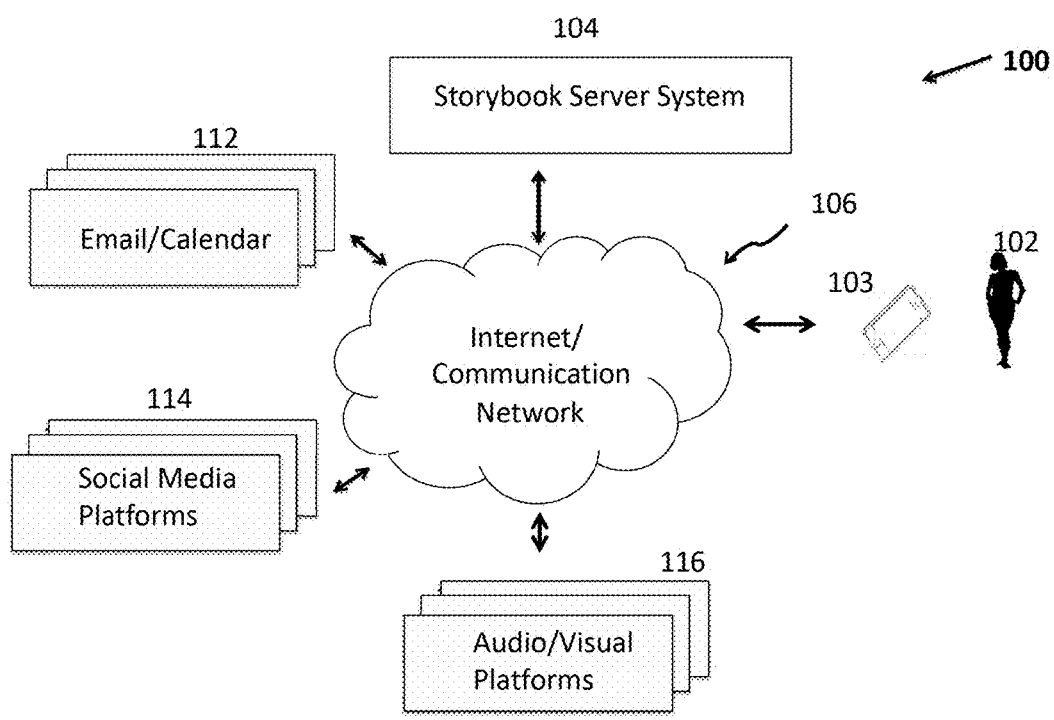
FIG. 1 illustrates a multisource data aggregation platform in accordance with an exemplary embodiment of the present disclosure.

FIG. 1 illustrates multisource data aggregation platform 100 in accordance with an exemplary embodiment of the present disclosure.

In FIG. 1, among other components, multisource data aggregation platform 100 comprises one or more users such as user 102 communicably coupled to storybook server system 104 via Internet/communication network 106. User 102 might access Internet/communication network 106 via a mobile device 103.

Here, Internet/communication network 106 is any wired or wireless communication network that allows data transfer from point to point. As implied by its name, storybook server system 104 might include one or more servers, either software, hardware or a combination of both for aggregating data from multiple sources. Although not shown, storybook server system 104 might also include one or more databases that store such aggregated content. Storybook server system 104 may include web servers in communication with user client applications via Internet/communication network 106 as well as application servers that in conjunction with the databases facilitate employing the aggregated data content to develop comprehensive storybook and timelines for one or more registered users such as user 102.

User 102 might be an individual with his or her information and/or information about the user located in multiple, desegregated and disparate locations. An example of information about the user may be a newspaper article about the user that is either current or from many years ago that is stored online.

User 102 may be any individual, entity, etc. that wishes to utilize storybook server system 104 to create and share journals, scrapbooks, etc. based on all of the stored information. In FIG. 1, user 102 can use multisource data aggregation platform 100 to create and share comprehensive private journals, scrapbooks, biographies, etc. One skilled in the art will understand that multisource data aggregation system 100 may have additional functionalities consistent with the spirit and scope of the present disclosure.

Multisource data aggregation platform 100 further comprises email/calendar system 112 and social media platform 114 that are also communicably coupled to storybook server system 104 via Internet/communication network 106. Social media platform 114 might be any existing social media platform, website or the like that facilitates interaction between friends or other user groups.

Such a platform might incorporate photo sharing, storage and postings among users. Typically, the longer the membership of a social media platform user, the more extensive the information stored about the member becomes. Social media platforms 114 might be one or more social media platforms such as Twitter™, Facebook™ and other such platforms on which user 102 is a registered user with at least one account.

Email/calendar system 112 might be any calendaring and/or email system that facilitates communication between users, i.e., sending of messages that might include attachments such as documents, photos, presentations, etc. An example of email/calendar platform 12 might be Gmail™ associated with Google, Inc., of Mountain View, Calif.

Multisource data aggregation platform 100 also includes other offline and online audio/visual platforms 116 beyond social media platform 114 and email/calendar system 112. Audio/visual platform 112 might include offline CDs and cloud storage systems allowing users to store data that they cannot otherwise store on their systems. Such systems may include Dropbox™, Amazon S3™, etc. Additional data sources might include without limitation news events, online and offline storage systems, backup systems, stored video and audio files, and photos, for example.

Briefly, in operation, user 102 may employ mobile device 103 to access storybook server system 104 via Internet/Communication network 106. User 102 might access storybook server system 104 to gather and collate comprehensive data received by storybook server system 104 from email/calendar 112 and social media platforms 114 as well as audio/visual platforms 116.

In this manner, even where information about a person is everywhere, users have access via a single interface and can collate and employ such disparate data sources to tell a consistent story. Unlike conventional systems where user data is stored in disparate data sources and may be subject to loss or access termination after many years of continuous accumulation, the present disclosure facilitates continuous access from a single interface for the foreseeable future. Social media participants with personal and other information on social media sites such as Facebook, for example, can combine both online and offline information residing for example on CDs and online storage platforms to generate a coherent story using such data sources.

A detailed operation of the multisource data aggregation system will be described with reference to the figures below.

Figure 2:
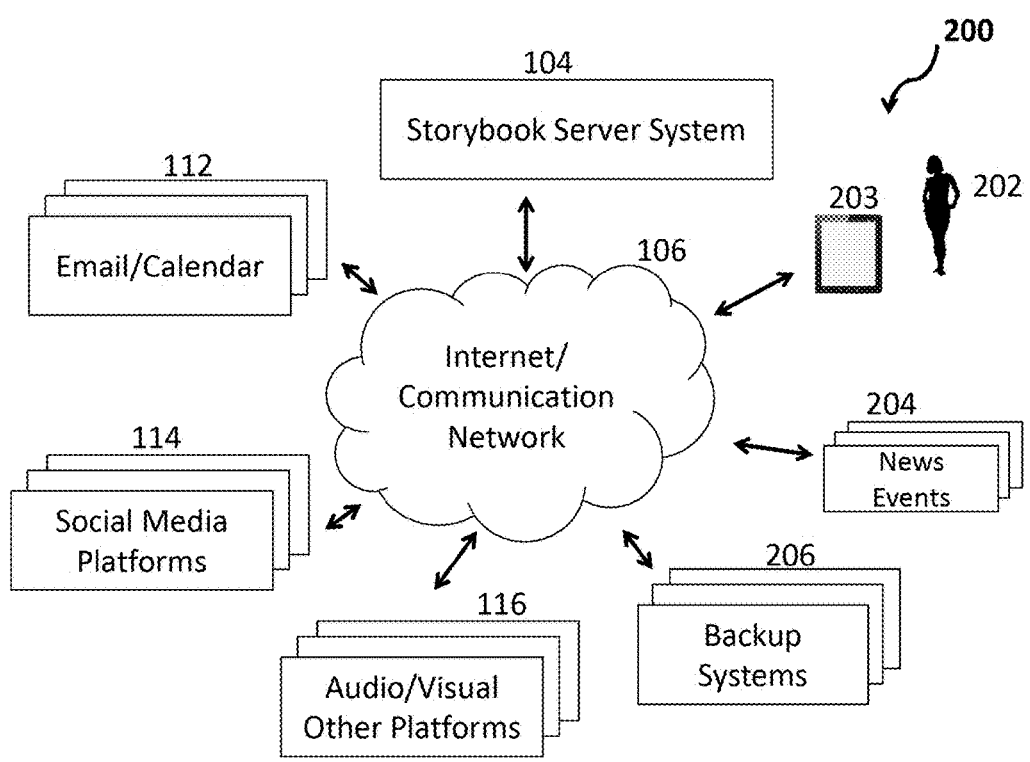
FIG. 2 illustrates a multisource data aggregation platform in accordance with an exemplary embodiment of the present disclosure.

FIG. 2 illustrates a multisource data aggregation platform 200 in accordance with an exemplary embodiment of the present disclosure.

In FIG. 2, unlike multisource data aggregation platform 100 of FIG. 1 that illustrates data sources email/calendar 112, social media platforms 114 and audio/visual platforms 116, multisource data aggregation platform 200 of FIG. 2 further comprises news events platform 204 and backup systems 206. Although not shown, one of ordinary skill in the art will realize that other comparable platforms consistent with the spirit and scope of the present disclosure may be utilized. For example, an additional data source that is not illustrated may be online bank and brokerage accounts belonging to a user.

Here, news events platform 204 might include a news portal or other online newspaper or magazine or news website. Backup systems 206 may include both offline and online backup systems. Offline backup systems may include USB hard drives and CDs, and online backup systems may include Amazon S3™ or other type cloud services. Thus, here, user 202 may then employ tablet 203 to access the various platforms to use storybook server system 104 for data aggregation.

Figure 3:
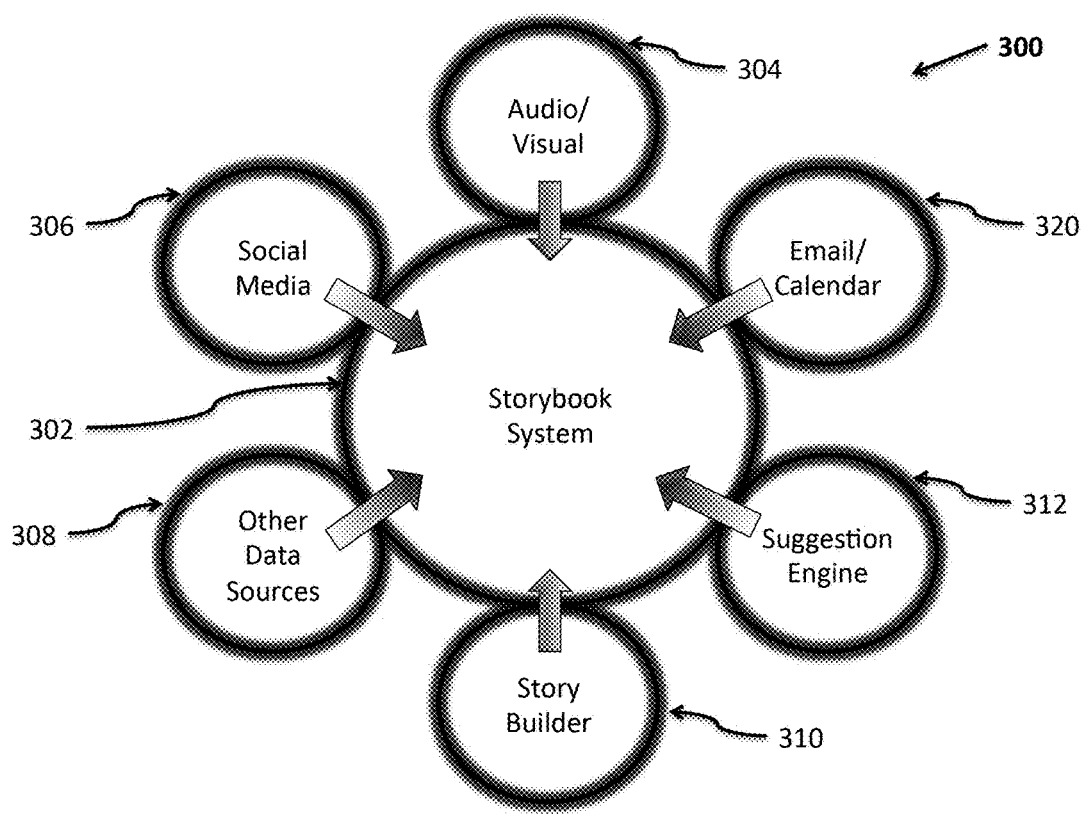
FIG. 3 illustrates a storybook system including comprehensive data sources according to an exemplary embodiment of the present disclosure.

FIG. 3 illustrates multisource data aggregation system 300 including comprehensive data sources according to an exemplary embodiment of the present disclosure.

Multisource data aggregation system 300 includes storybook system 302 and email/calendar 320 that transmits and receives messages via an electronic network. Examples of email/calendar 320 include Gmail™, Yahoo™, Outlook™ etc. Email/calendar connector 320 also includes scheduling systems that can schedule and store appointments electronically. Email/calendar connector 320 may further include selected calendar events, ad hoc comments, and any other email, calendaring, meeting and scheduling systems within the scope of the present disclosure.

Storybook system 302 is any platform configured to receive data from multiple communication networks or data sources and generate a story from said information. Preferably, a consistent and coherent story with context is generable from at least two or more of such data sources or communication networks. In one embodiment, storybook system 302 and storybook server system 104 are synonymous.

In FIG. 3, multisource data aggregation platform 300 further comprises a plurality of connectors including audio/visual 304 connector and social media 306 connector that can connect to any existing social media platform, website or the like that facilitates interaction between friends or other user groups. Such social media platforms might include Facebook™ and Google™, for example. These are but examples of social media platforms for use with the present disclosure. Other examples are Twitter™, YouTube™, Instagram™, WhatsApp™, LinkedIn™, Tumblr™ and other social media types within the spirit and scope of the present disclosure.

Audio/visual 304 connector can connect to offline and online storage for photos, videos, audio files, and the like that may include offline CDs, cloud storage systems allowing users to store large amounts of data. Such systems may include Dropbox™, Amazon S3™, etc.

As shown in FIG. 3, multisource data aggregation system 300 also comprises other data sources 308, story builder 310 and suggestion engine 312, all of which are configured to connect to multisource data aggregation system 300. Other data sources 308 may include Ancestry™, 23andMe™, Dropbox™, SkyDrive™, Google Docs™, iCloud™, URL linked content, file uploading from personal drives, and any other data aggregation or data storage systems. As can be seen, embodiments of the present disclosure are comprehensive and encompass multiple and broad-based access to many different data sources where a user's information is stored.

Story builder 310 facilitates using all of the user information from connectors to write a story about the user. Specifically, story builder 310 might facilitate selection of events for inclusion in a biography or story about the user. Story builder 310 may use events, moments, etc., for a story, for example.

Suggestion engine 312 incorporates data from all of the other connectors and may suggest questions or associations based on data obtained from the other connectors. Suggestion engine 312 may include linked data Freebase, DBpedia, etc.). Suggestion engine 312 may also include mobile activity tracker, local and time-based news/events, selected global news sources and other sources. Suggestion engine 312 provides context for events and moments. Specifically, suggestion engine 312 uses relational algorithms to help propose contextual content from linked databases and other readily available data sources on the Internet for use in personal storybooks and timelines.

In use, storybook system 302 connects with all of the connectors and in conjunction with story builder 310 and suggestion engine 312 can create a comprehensive private multisource data aggregation that can be used for any number of functionalities including sharing, story building, etc., as further described in FIG. 4.

Figure 4A:
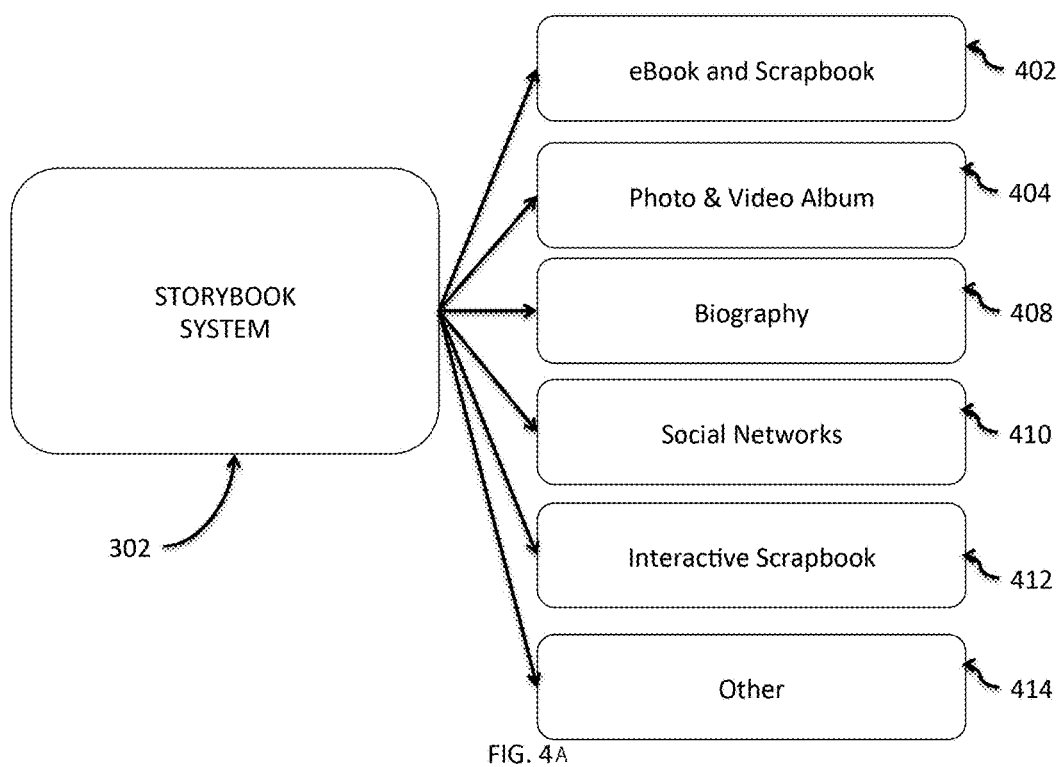
FIG. 4A illustrates potential use cases for the storybook system of FIG. 3.

FIG. 4A illustrates potential use cases for storybook system 302 of FIG. 3.

These use cases include e-book and scrapbook 402, photo and video album 404, biography 408 etc. Storybook system 302 may also be used in conjunction with social networks 410, interactive scrapbook 412 as well as other 414 uses consistent with the spirit and scope of the present disclosure.

In FIG. 4A, the system may also provide data ready for various printable formats. The present system can also be used by parents to create a comprehensive record and history of their children. The present system can also be used to contribute to existing storybooks started by parents or to start a new one.

Adults can use the present system to compose personal life stories with intuitive memory aids and to collaborate with friends and family to gather forgotten memories for their storybooks. Organizations can use the system for story sharing as well as to archive evolution of the organization's stories. The system can be used by biographers to aid writing biographies. The system can be used by researchers to research publicly shared storybooks, events, and timelines. The present disclosure provides an intuitive suggestion engine to help find relations and interactions among people.

Figure 4B:
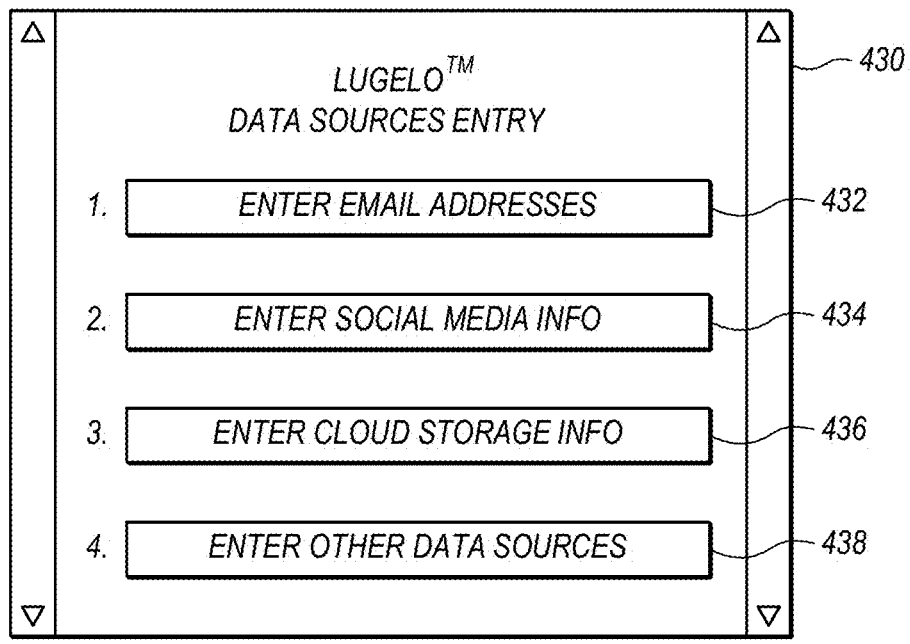
FIG. 4B illustrates a data sources entry interface screenshot according to an exemplary embodiment of the present disclosure.

FIG. 4B illustrates data sources entry 430 interface screenshot according to an exemplary embodiment of the present disclosure.

Figure 4C:
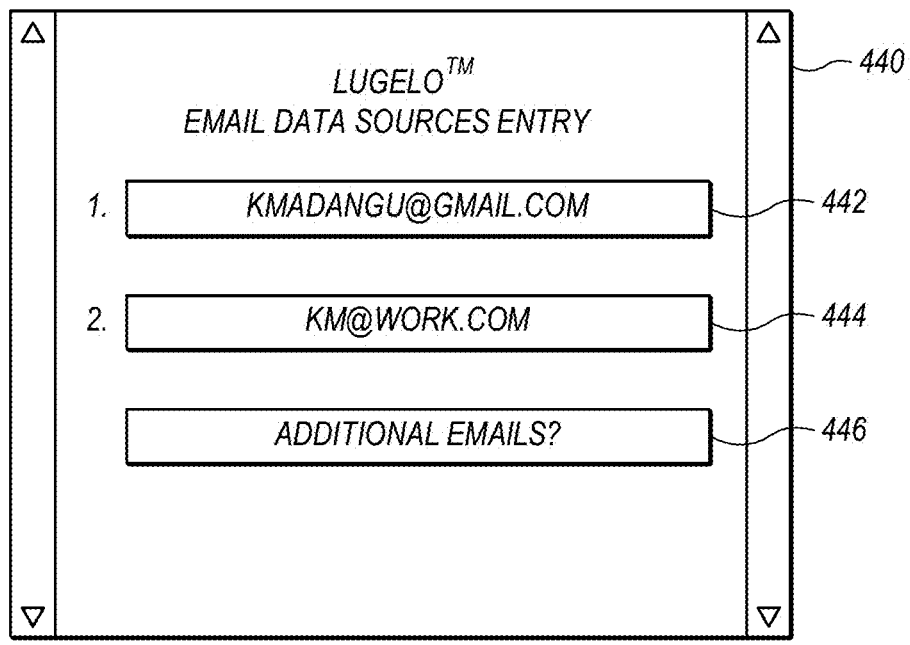
FIG. 4C illustrates an email data source entry interface screenshot according to an exemplary embodiment of the present disclosure.

In FIG. 4B, user 102 employs data sources entry 430 interface to store her data source information for later access by storybook server system 104 (of FIG. 1). Specifically, as shown, data source entry 430 interface includes "Enter Email Addresses" button 432. Upon selection of "Enter Email Addresses" button 432, user 102 can enter one or more email addresses as illustrated in FIG. 4C. The email addresses are for user 102's email accounts that the user wishes to access via storybook server system 104 (FIG. 1).

FIG. 4C illustrates email data source entry 440 interface screenshot according to an exemplary embodiment of the present disclosure.

In FIG. 4C, user 102 employs email data source entry 440 interface to enter her email addresses. Here, after selecting "Enter Email Addresses" button 432 of FIG. 4B, user 102 has entered email address "KMADANGU@GMAIL.COM" 442 and "KM@WORK.COM" 444. Additional email addresses can also be entered via "Additional Emails?" button 446. Once an email is entered, user 102 can then enter access credentials for the specified email as shown in FIG. 4D.

Figure 4D:
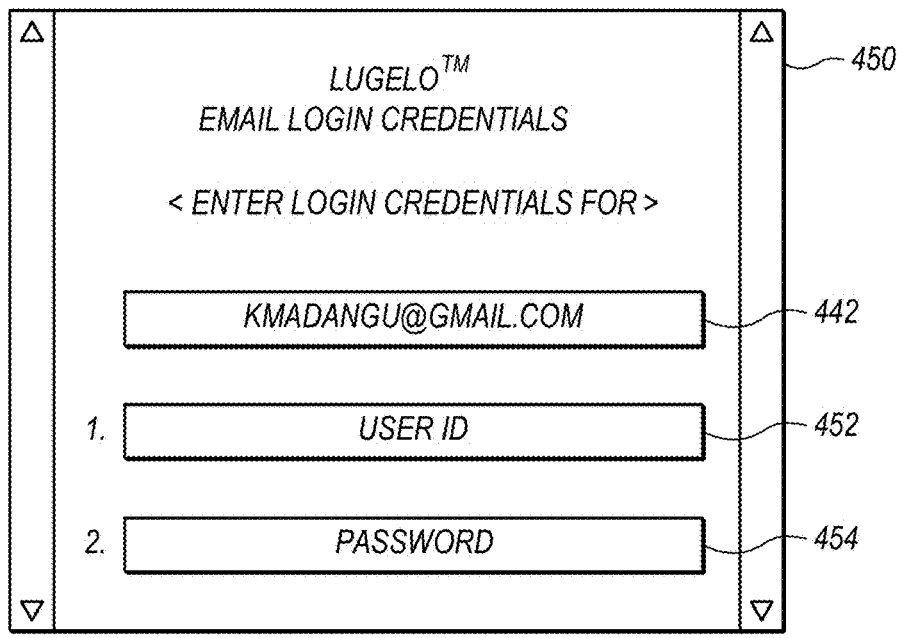
FIG. 4D illustrates an email login credentials interface screen shot according to an exemplary embodiment of the present disclosure.

FIG. 4D illustrates email login credentials 450 interface screen shot according to an exemplary embodiment of the present disclosure.

In FIG. 4D, user 102 uses email login credentials 450 to enter login credentials for specified email addresses. For email address "KMADANGU@GMAIL.COM" 442, user 102 enters her userid by selecting userid 452 and enters her password by selecting password 454. Once all credentials are received, multisource data aggregation platform 100 validates the information to ensure the specified email accounts can be accessed by multisource data aggregation platform 100. User 102 can then continue to specify additional data sources as shown in FIG. 4B.

Figure 4E:
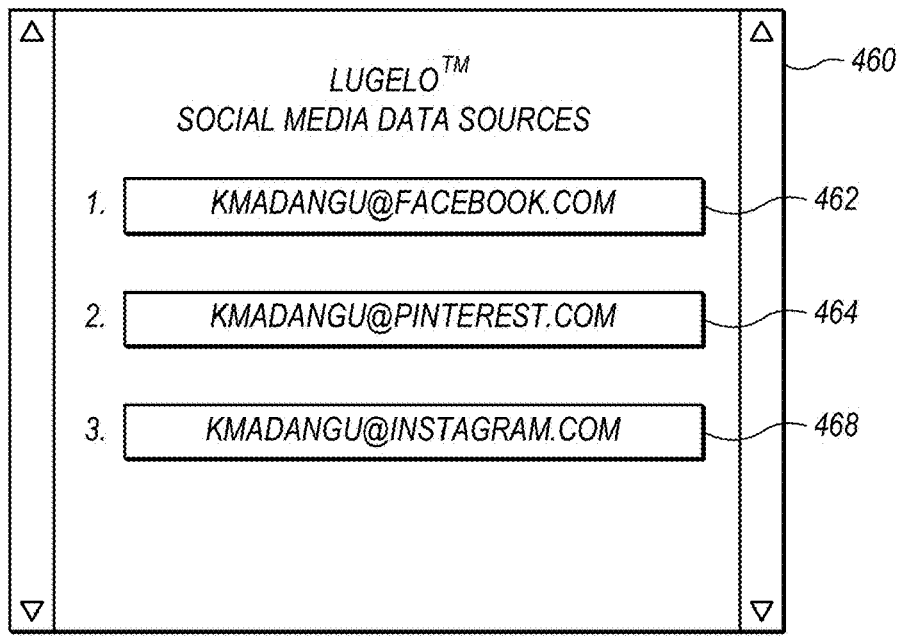
FIG. 4E illustrates a social media data sources interface screenshot according to an exemplary embodiment of the present disclosure.

Referring now to FIG. 4B, upon selection of "Enter Social Media Info" 434, user 102 can enter one or more social media accounts as illustrated in FIG. 4E. The social media accounts are for the accounts that user 102 wants to access via storybook server system 104.

FIG. 4E illustrates social media data sources 460 interface according to an exemplary embodiment of the present disclosure.

In FIG. 4E, user 102 has specified (using "Enter Social Media Info" button 434 of FIG. 4B) a number of social media accounts including KMADANGU@FACEBOOK.COM 462, KMADANGU@PINTEREST.COM 464 and KMADANGU@INSTAGRAM.COM 468. Although not shown, once a social media account is specified, corresponding login credentials for that social media account must be entered for validation by multisource data aggregation system 100.

Referring now to FIG. 4B, user 102 may further specify cloud storage accounts by selecting "Enter Cloud Storage Info" button 436. For example, if user 102 has a Dropbox account (not shown), user 102 might enter that account and associated login credentials for that account.

Similarly, in FIG. 4B, user 102 can also enter other data sources by selecting "Enter Other Data Sources" button 438. If the other data sources are online accounts, the necessary login credentials must be specified. If the other data sources are offline, e.g., on CD, user 102 might be prompted to enter an access or virtual drive for access to information stored therein.

User 102 has now entered all of her data sources and can begin to utilize the system. Although not shown, one of ordinary skill in the art will realize that the present disclosure contemplates that other data sources can be utilized consistent with the spirit and scope of the present disclosure. For example, if she has one, user 102 might wish to link her iTunes account to multisource data aggregation system 100 to provide storyline access to her audio files.

Figure 5:
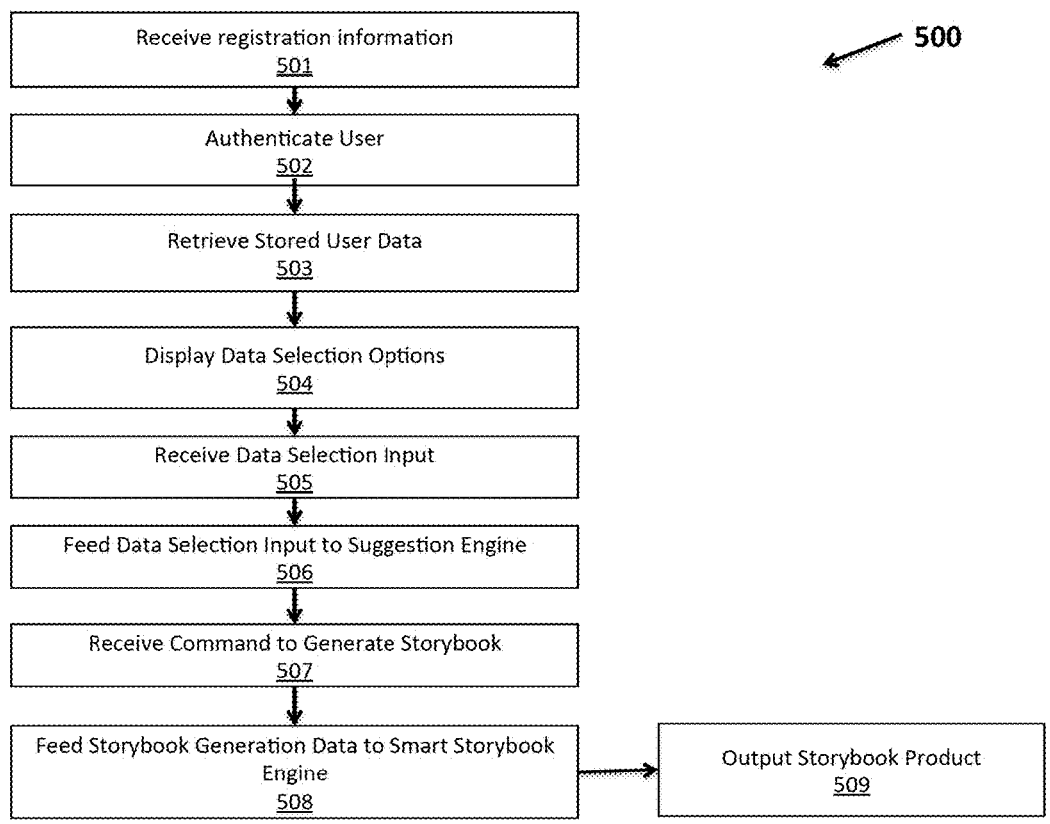
FIG. 5 illustrates a multisource data aggregation process for use with an exemplary embodiment of the present disclosure.

FIG. 5 illustrates a multisource data aggregation process 500 for use with an exemplary embodiment of the present disclosure.

In FIG. 5, a multisource data aggregation process 500 begins by receiving registration information 501 from a user. Receiving registration information 501 can include an initial registration by a first-time user of the multisource data aggregation system as well as a subsequent logon by a returning user of the multisource data aggregation system where the returning user has previously registered. An example of registration information is an email address, password, or other identifying information associated with a user.

Upon authentication of the user 502, any data associated with the user is retrieved 503 for access and editing by the user. Whether or not there is data stored and associated with the user, the user is presented with an opportunity to select initial or additional data.

Data for selection by the user is displayed 504 on a display device to which the user has access. Data for selection by the user is in any form as described herein including for example emails, calendar items, videos, audio files, digital photos, locally stored files, cloud-based content, or comments on photos from social networking sites, ancestry information, DNA information, news articles, and the like.

As an example, a user may peruse a checklist that displays different data types for selection. The aggregation system (of storybook server system 104 for example) receives input from the user including data for selection 505, and feeds the data selection input to a suggestion engine 506. The suggestion engine analyzes the data and provides suggestions for additional data as is explained and depicted in FIG. 6.

Upon completion of data selection by the user, either directly or through use of the suggestion engine, the system receives a command from the user to generate a storybook 507.

A storybook engine, according to one embodiment of the present disclosure, can be considered a "smart" engine in that it can provide additional feedback to the user in real-time during generation of the storybook. All of the data received thus far as selections by the user is fed to the smart storybook engine 508. The smart storybook engine analyzes the data and steps through a series of additional questions with the user to continue to flesh out the story or timeline. Upon completion of the additional questions and storybook or timeline generation, the storybook product is output or displayed 509.

Figure 6:
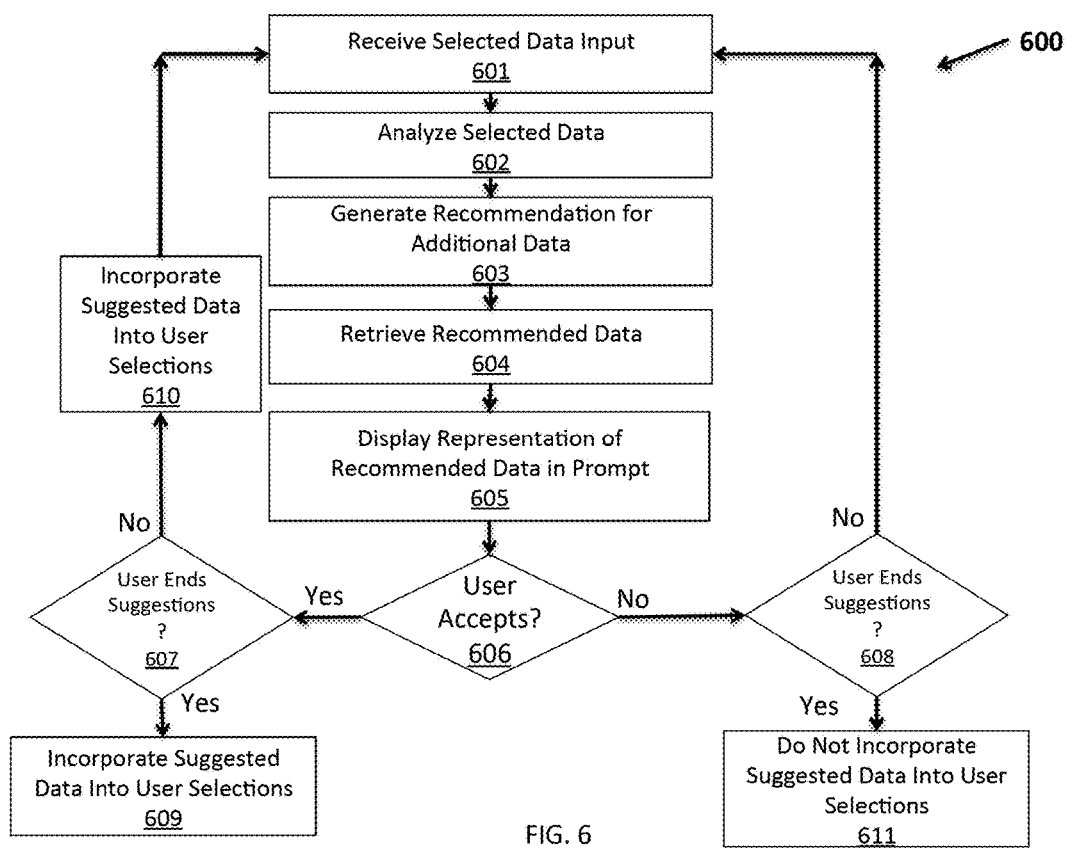
FIG. 6 illustrates a suggestion engine process for use with an exemplary embodiment of the present disclosure.

FIG. 6 illustrates a suggestion engine process 600 for use with an exemplary embodiment of the present disclosure.

In FIG. 6, a suggestion engine process 600 begins by receiving selected data input from a user 601. The data is analyzed 602 so that recommendations for additional data can be generated 603. Over time, in response to user feedback, the suggestion engine 600 learns in order to improve future suggestions.

The recommended additional data is retrieved 604, and a representation of the additional data is displayed as a prompt 605 to the user.

If the user accepts the additional data, and the user has not chosen to stop receiving suggestions 607, the additional suggested data is incorporated into the user selections and the engine process 600 continues with the accumulated selected data 601. If the user accepts the additional data 606, and the user has chosen to stop receiving suggestions 607, the additional suggested data is added to the user selections and the process 600 is complete.

If the user does not accept 606 the additional data, and the user has not chosen to stop receiving suggestions 608, the suggestion engine process 600 continues with the thus far accumulated selected data 601 but not the most recent suggested additional data. If the user does not accept 606 the additional data, and the user has chosen to stop receiving suggestions 608, the suggestion engine process 600 is complete.

Figure 7A:
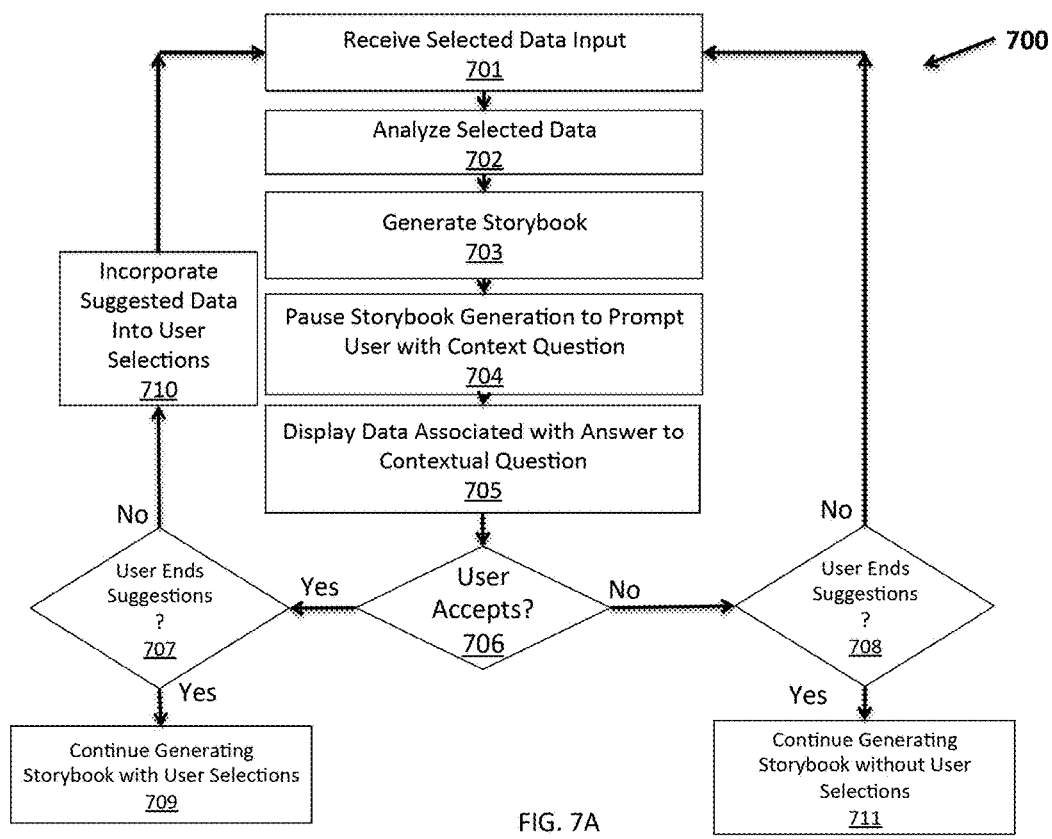
FIG. 7A illustrates a storybook engine for use with an exemplary embodiment of the present disclosure.

FIG. 7A illustrates a storybook engine 700 for use with an exemplary embodiment of the present disclosure.

In FIG. 7A, at 701, a storybook engine 700 receives all data from the suggestion engine and data sources and compiles the data into a timeline. While compiling the data, the storybook engine 700 prompts along the way during timeline compilation in order to supplement the story and add context.

Storybook engine 700 begins by receiving selected data input from the combination of a suggestion engine and a user. The data is analyzed 702 so that generation of a storybook 703 can begin and recommendations for additional data can be generated. Over time, with user feedback, the storybook engine 700 learns to improve future suggestions.

The storybook generation is periodically interrupted so that the system may prompt a user with a contextual question 704. An example of a contextual question may be "why" some occurrence happened as evidenced by the user selected data. Upon receipt of the answer to the contextual question, data associated with the answer to the contextual question is displayed 705 in a prompt to the user for inclusion.

At 706, if the user accepts additional data, the process proceeds to 707. At 707, if the user does not end data suggestions by the system, the process returns to 710, where the system adds the additional suggested data to the user selections; the process then returns to 701; here, storybook engine 700 begins to repeat the process by receiving selected data input.

At 707, if the user stops data suggestions by the system, the process proceeds to 709. At 709, storybook engine 700 continues to use the user selections to for the storybook to complete the process.

Returning now to 706, if the user does not accept additional data, the process proceeds to 708. At 708, if the user does not end suggestions, the process returns to 701 where the process is repeated. At 708, if the user stops data suggestions by the system, the process progresses to 711, where the storybook engine 700 continues generating the storybook without user selections, after which the process is completed.

Figure 7B:
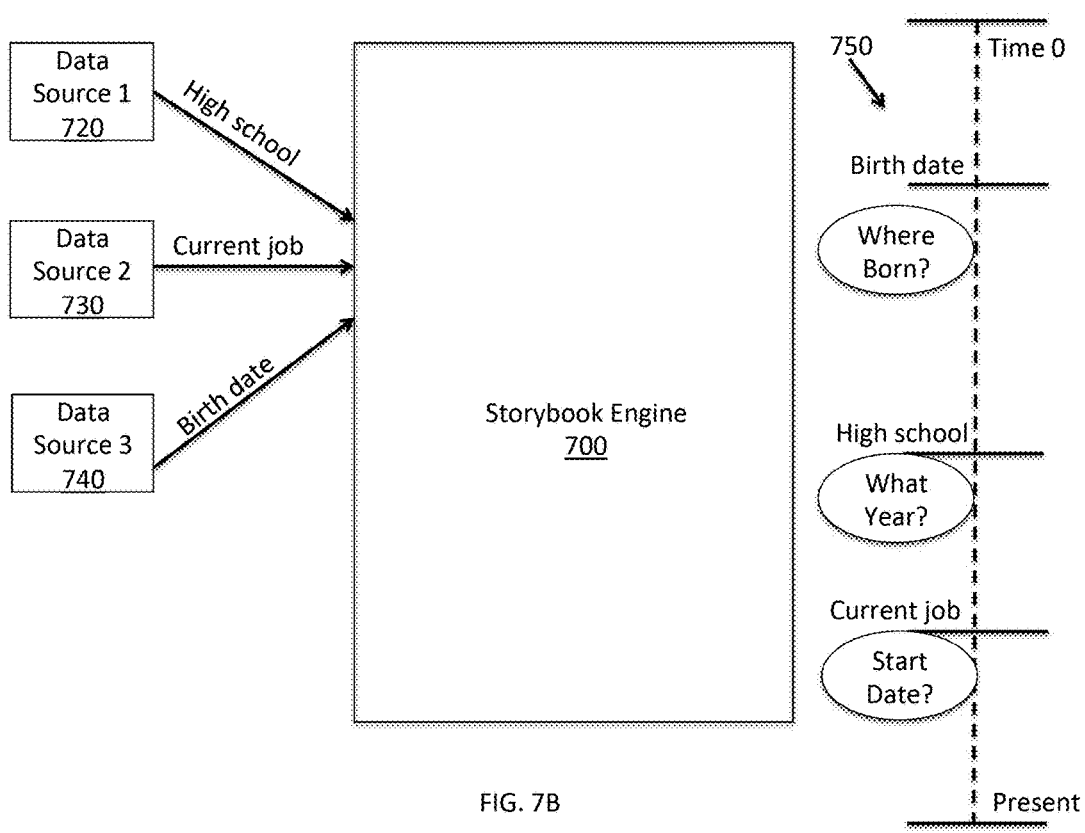
FIG. 7B illustrates an exemplary storybook compilation according to an exemplary embodiment of the present disclosure.

FIG. 7B illustrates an exemplary storybook compilation according to an exemplary embodiment of the present disclosure.

In FIG. 7B, storybook engine 700 receives data from data source 1 720, data source 2 730, and data source 3 740. Data source 1 720 provides the name of a user's high school. Data source 2 730 provides the title of the user's current job. Data source 3 740 provides the user's birth date.

Storybook engine 700 analyzes the data received from the data sources and compiles them into a timeline 750 based on dates associated with the data. During compilation of the timeline 750, storybook engine 700 generates and displays to the user additional questions to provide more context to the data already received.

It is noted that the timeline itself may be associated with an email address of the user and might be retrieved for the user upon receipt of the user's email address. The timeline may also be in the form of a storybook, an e-book, a biography, a journal, a scrapbook, or a child activity monitor wherein the smart storybook engine generates a list of contextual questions that are not answered based on the data and alternative suggested data. With regard to the smart storybook engine of the present disclosure, it generates the list of contextual questions based on parsed retrieved web-based data; the suggestion engine may also generate a list of data items that are not selected by the user from the data source and generate a list of data items based on parsed retrieved web-based data.

Figure 8:
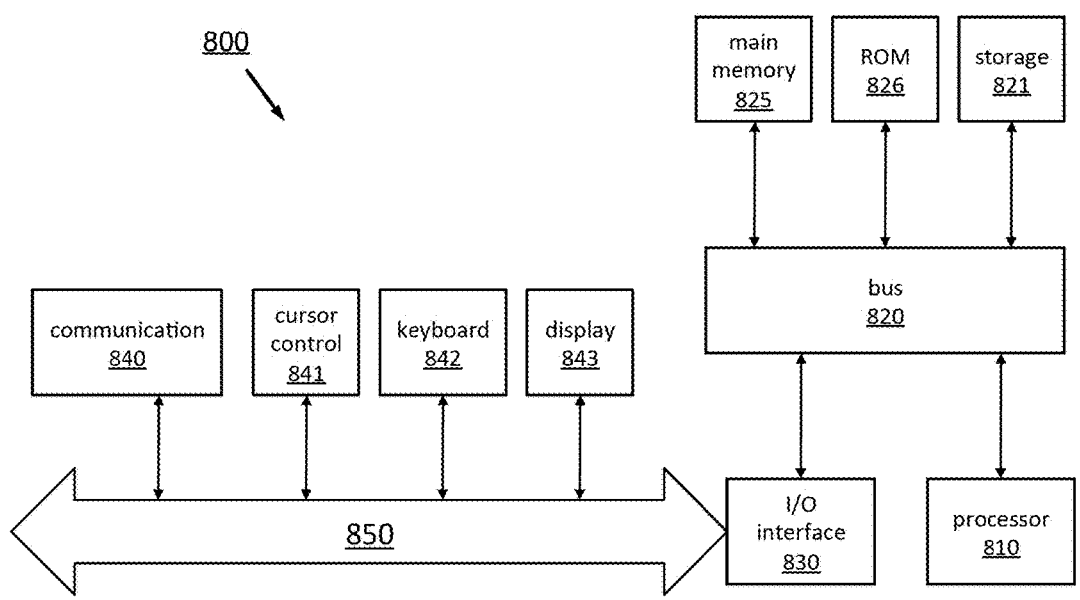
FIG. 8 illustrates an exemplary computer architecture for use with an exemplary embodiment of the present disclosure.

FIG. 8 illustrates an exemplary computer architecture 800 for use with an exemplary embodiment of the present disclosure.

The present disclosure comprises various computing entities that may have an architecture according to exemplary architecture 800. One embodiment of architecture 800 comprises a system bus 820 for communicating information and a processor 810 coupled to bus 820 for processing information. Architecture 800 further comprises a random access memory (RAM) or other dynamic storage device 825 (referred to herein as main memory), coupled to bus 820 for storing information and instructions to be executed by processor 810. Main memory 825 may also be used for storing temporary variables or other intermediate information during execution of instructions by processor 810. Exemplary architecture 800 may also include a read-only memory (ROM) and/or other static storage device 826 coupled to bus 820 for storing static information and instructions used by processor 810.

A data storage device 825 such as a magnetic disk or optical disc and its corresponding drive may also be coupled to architecture 800 for storing information and instructions. Architecture 800 can also be coupled to a second I/O bus 850 via an I/O interface 830. A plurality of I/O devices may be coupled to I/O bus 850, including a display device 843, an input device (e.g., an alphanumeric input device 842 and/or a cursor control device 841).

The communication device 840 allows for access to other computers (e.g., servers or clients) via a network. The communication device 840 may comprise one or more modems, network interface cards, wireless network interfaces or other interface devices such as those used for coupling to Ethernet, token ring, or other types of networks.

Key Operational Features

The present disclosure may be employed for storybook sharing. Shared storybooks in various forms such as e-books, albums and video, print media, etc. can be used as a proprietary suggestion engine, highly interactive and intuitive tools to propose information for inclusion in the respective storybook based on events, activities and other data present in the storybook timeline.

The system can be utilized as a linked data source. The system can be used to gather GPS location-based events and activities for manual user selection in storybooks. The system includes a builder engine that is based on popular themes such as birthdays, births, family vacations, etc. A suggestion engine can be used to access relevant linked databases. The system can manage multiple storybooks and provides a comprehensive selection of data sources.

While the above is a complete description of exemplary specific embodiments of the disclosure, additional embodiments are also possible. Thus, the above description should not be taken as limiting the scope of the disclosure.

I claim:

1. A computer-implemented method, comprising:
   aggregating data associated with a user from a plurality of data sources, each data source of the plurality of data sources containing data of information associated with the user;
   retrieving the aggregated data associated with user;
   displaying the retrieved aggregated data associated with the user for selection by the user;
   receiving, from the user, selected data from the displayed retrieved aggregated data associated with the user;
   feeding the selected data to a suggestion engine, wherein the suggestion engine recommends additional data from the aggregated data by analyzing the selected data, prompts the user for accepting the recommended additional data, and incorporates the recommended additional data into the selected data if the user accepts the recommended additional data;
   prompting the user for additional information based on the selected data;
   incorporating the additional information into the selected data if the user accepts the additional information;
   compiling the selected data into a timeline based on date information associated the selected data; and
   displaying the timeline to the user.

2. The method of claim 1, wherein the plurality of data sources are selected from at least one of a social networking site, a dating site, a professional networking site, a personal drive, an ancestry DNA site, a cloud storage site, a cloud-based document word processing site, and a URL linked content.

3. The method of claim 1, wherein the selected data and additional data are selected from the group comprising: emails, calendar items, videos, audio files, digital photos, locally stored files, cloud-based content, photos, comments on photos from social networking sites, ancestry information, DNA information, historic events, and news articles.

4. The method of claim 1, wherein the timeline is associated with an email address of the user.

5. The method of claim 4, wherein the timeline is retrieved for the user upon receipt of the user's email address.

6. The method of claim 1, wherein the timeline is in the form of one of a storybook, an e-book, a biography, a journal, a scrapbook, or a child activity monitor.

7. The method of claim 1, wherein a smart storybook engine generates a list of contextual questions based on the selected data.

8. The method of claim 7, wherein the smart storybook engine generates the list of contextual questions based on parsed retrieved web-based data.

9. The method of claim 1, further comprising: using the suggestion engine to generate a list of data items that are not selected by the user from a data source.

10. The method of claim 9, wherein the suggestion engine generates the list of data items based on parsed retrieved web-based data.

11. The method of claim 1, further comprising: providing user feedback about the recommended additional data to improve future suggestions of additional data.

12. A non-transitory computer-readable medium encoded with a computer program including instructions to cause a processor to perform a method comprising:
- aggregating data associated with a user from a plurality of data sources, each data source of the plurality of data sources containing data of information associated with the user;
- retrieving the aggregated data associated with user;
- displaying the retrieved aggregated data associated with the user for selection by the user;
- receiving, from the user, selected data from the displayed retrieved aggregated data associated with the user;
- feeding the selected data to a suggestion engine, wherein the suggestion engine recommends additional data from the aggregated data by analyzing the selected data, prompts the user for accepting the recommended additional data, and incorporates the recommended additional data into the selected data if the user accepts the recommended additional data;
- prompting the user for additional information based on the selected data;
- incorporating the additional information into the selected data if the user accepts the additional information;
- compiling the selected data into a timeline based on date information associated the selected data; and
- displaying the timeline to the user.

13. A storybook system comprising:
- a suggestion engine; and
- a storybook server, implemented with a processor, and configured to:
- aggregate data associated with a user from a plurality of data sources, each data source of the plurality of data sources containing data of information associated with the user;
- retrieve the aggregated data associated with user;
- display the retrieved aggregated data associated with the user for selection by the user;
- receive, from the user, selected data from the displayed retrieved aggregated data associated with the user;
- feed the selected data to the suggestion engine, wherein the suggestion engine recommends additional data from the aggregated data by analyzing the selected data, prompts the user for accepting the recommended additional data, and incorporates the recommended additional data into the selected data if the user accepts the recommended additional data;
- prompt the user for additional information based on the selected data;
- incorporate the additional information into the selected data if the user accepts the additional information;
- compile the selected data into a timeline based on date information associated the selected data; and
- display the timeline to the user.

14. The system of claim 13, wherein the suggestion engine learns in order to improve future suggestions of additional data.

15. The system of claim 13, wherein a smart storybook engine generates a list of contextual questions that are based on the selected data.

* * * * *